United States Patent [19]

Seeler

[11] Patent Number: 4,473,897
[45] Date of Patent: Sep. 25, 1984

[54] TUBULAR BERYLLIUM PHONOGRAPH NEEDLESHANK AND METHOD OF FORMATION

[75] Inventor: Charles C. Seeler, Evanston, Ill.

[73] Assignee: Shure Brothers, Inc., Evanston, Ill.

[21] Appl. No.: 349,669

[22] Filed: Feb. 17, 1982

[51] Int. Cl.³ .............................................. G11B 3/02
[52] U.S. Cl. ................................................. 369/170
[58] Field of Search ................ 369/170, 171, 172, 173

[56] References Cited

U.S. PATENT DOCUMENTS

| | | |
|---|---|---|
| 2,311,385 | 2/1943 | Hasbrouck . |
| 3,526,728 | 9/1970 | Iga . |
| 3,587,658 | 6/1971 | Giltner .............................. 138/154 |
| 3,865,997 | 2/1975 | Halter . |
| 3,909,008 | 9/1975 | Sakai . |
| 3,961,797 | 6/1976 | Tsukagoshi . |
| 3,983,335 | 9/1976 | Nemoto . |
| 4,033,474 | 7/1977 | Rentmeester ...................... 138/156 |
| 4,124,783 | 11/1978 | Nemoto . |

Primary Examiner—Steven L. Stephen
Attorney, Agent, or Firm—Allegretti, Newitt, Witcoff & McAndrews, Ltd.

[57] ABSTRACT

A phonograph stylus shank is formed by annealing and rolling beryllium sheet into a tube with an overlapping seam.

5 Claims, 10 Drawing Figures

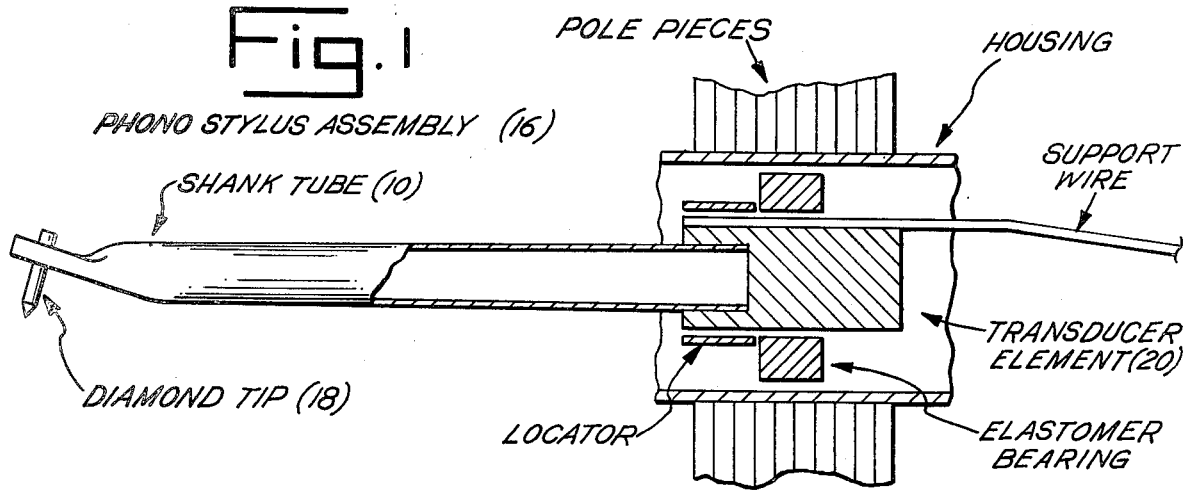
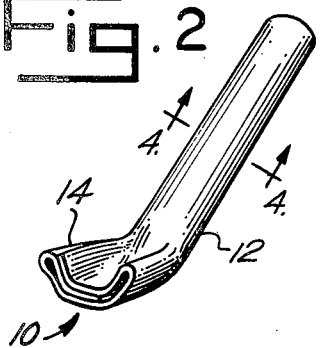
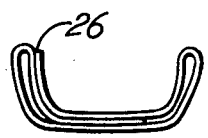
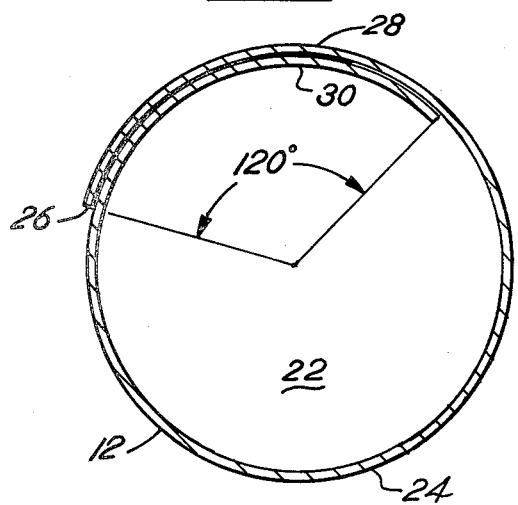
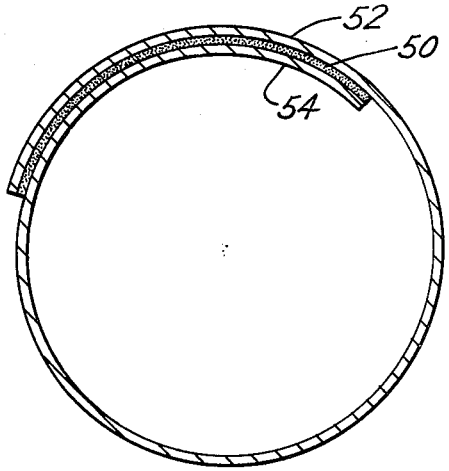

TUBULAR BERYLLIUM PHONOGRAPH NEEDLESHANK AND METHOD OF FORMATION

BACKGROUND OF THE INVENTION

This invention relates to a phonograph stylus, and more particularly to a tubular beryllium phonograph stylus shank and its method of formation.

In a phonograph record playback system including a cartridge with a stylus assembly, for example, as disclosed in U.S. Pat. No. 3,077,522 the magnet-stylus subassembly principally determines trackability, or the ability of the playback system to cope with the amplitude, velocity and acceleration variations demanded by a modulated record groove. The elements of this subassembly are the diamond tip, the stylus cantilever or shank, and the electromechanical transducer, as shown by way of example in FIG. 1 of the accompanying drawing. Advances in recent years to enhance trackability have been directed toward reducing the effective mass of the subassembly. While the diamond tip, the magnet or transducer element, and the shank connecting the two all contribute to the effective mass of the moving "system", the major efforts of research and development have been to reduce the effective mass of the shank, since it is typically the largest contributor to the total system mass. This work has concentrated on selecting shank materials as well as on forming those materials into advantageous shapes. The ideal stylus shank would have infinite stiffness to prevent its bending, to ensure a precise transmission of motional information from the tip to the transducer. Also, the ideal shank would be without mass, so that no inertial forces could inhibit trackability. Available materials, however, vary significantly in approaching these ideals. In recent years, some exotic materials such as beryllium and boron have been identified as material candidates.

Table 1 below lists several materials that, because of their intrinsic properties, may be considered suitable for fabricating stylus shanks. The modulus of elasticity (a characteristic related to stiffness) and the density (a characteristic related to mass) are shown for each material. Also listed is the modulus-density ratio (often called "specific stiffness"), a basic figure of merit (higher is better) when comparing materials for their suitability as shank material. Beryllium, boron, and diamond are seen to be, at least theoretically, significantly more suited as shank material than an old standby, aluminium.

TABLE I
BASIC PROPERTIES OF MATERIALS

| MATERIAL | MODULUS (STIFFNESS) dynes/cm$^2$ × 10$^{12}$ | DENSITY grams/cm$^3$ | RATIO (MODULUS/DENSITY) cm$^2$/sec$^2$ × 10$^{12}$ |
|---|---|---|---|
| ALUMINUM | 0.72 | 2.70 | 0.27 |
| BERYLLIUM | 2.9 | 1.85 | 1.58 |
| BORON | 4.4 | 2.34 | 1.88 |
| SAPPHIRE | 3.3–3.9 | 3.9–4.1 | 0.93 |
| DIAMOND | 7.4–10.5 | 3.15–3.5 | 2.88 |

While the modulus-density ratio may seem to be the final determining factor in the selection of a shank material, the individual properties of modulus and density cannot be ignored. A material, for instance, with both exceedingly high modulus and density, yet with a high modulus-density ratio, may still result in a shank with excessive effective mass, if that material cannot be formed into a suitable geometric shape that takes advantage of its high ratio.

Table 2 below is similar to Table 1 in that stiffness, effective mass, and their ratio are tabulated. However, Table 2 tabulates these characteristics for various shank geometries, not shank materials.

TABLE 2
SHANK GEOMETRY AND PERFORMANCE FACTORS

| | LENGTH "L" INCHES | OUTER DIAMETER, INCHES | WALL THICKNESS, INCHES | STIFFNESS (RELATIVE) | M$_{EFF}$ (RELATIVE) (SEE NOTE) | STIFFNESS/M$_{EFF}$ RATIO |
|---|---|---|---|---|---|---|
| ROD | 0.25 | 0.010 | — | 1.0 | 1.0 | 1.0 |
| TUBE | 0.25 | 0.014 | 0.002 | 3.0 | 1.0 | 3.0 |
| TUBE | 0.25 | 0.030 | 0.00075 | 15.0 | 0.88 | 17.0 |

NOTE: Effective mass contribution of shank assumes shank to be pivoted at one end and driven at other end The material of all the shanks is considered fixed, as is its length. The 0.010" diameter solid rod of 0.250" length is used as a reference and arbitrarily given the reference value of unity for each of the three parameters. The cross sections are then compared relative to this reference. The 0.014" outside diameter tube with 0.0002" wall thickness has the same effective mass as the reference rod, but is three times stiffer. The 0.030" diameter tube with 0.00075" wall thickness, even with somewhat lower mass than the reference, is 15 times stiffer than the solid rod.

Thus, the ability or inability of a material to be formed into a thin-walled structure greatly changes the advantage seemingly provided by favorable properties as tabulated in Table 1. For example, from Table 1, the modulus-density ratio of diamond is seen to be approximately 11 times that of aluminum. But FIG. 2 shows that the modulus-density ratio of a 0.030" diameter thin-walled tube is 17 times greater than a solid rod of 0.010" diameter. In this case then, a thin-walled tube made of aluminum has more than 50% (17/11=1.55) basic performance advantage over a solid rock of diamond.

As a second example, the modulus-density ratio of beryllium is approximately 5.8 times that of aluminum. However, beryllium has been difficult to shape because of its low ductility. Of the known shanks having some beryllium, all but one involve vacuum deposited beryllium, as in U.S. Pat. No. 3,961,797. The one exception is the shank of U.S. Pat. No. 3,909,008, taught at column 4, lines 50–57, to be rolled from beryllium into a tubular form with a longitudinal slit or gap. While this last shank is said to have advantages, the slit appears to weaken the shank by reducing its stiffness, and appears to cause great manufacturing difficulty.

SUMMARY OF THE INVENTION

Thus, an object of the invention is to provide a phonograph stylus or stylus shank which is a dramatically more ideal shank than any shanks available at the present.

Another object of this invention is to provide a stylus shank having an extremely high modulus-density ratio.

Another object of the invention is to provide a phonograph shank having an extremely low mass.

In addition to geometric and intrinsic material properties, other factors influence stylus performance: (1) the ultimate strength of the shank to allow reasonable handling during use, as well as during the fabrication of the stylus assembly; (2) the ability to allow a diamond tip to be rigidly and permanently affixed to its end; (3) corrosion resistance; and (4) the ability for the entire assembly to be produced repeatedly and in quantity, and not merely to remain a laboratory curiosity.

Thus, other objects of the invention are to provide a phonograph stylus shank with a high ultimate strength, an ability to receive a diamond tip, and corrosion resistance, yet able to be produced in quantity.

These and other objects and advantages are provided by the invention which, in a principal aspect, is a phonograph stylus shank formed from beryllium into a tube having a longitudinal, overlapping seam. The stylus shank is rolled from a sheet of beryllium, by a process comprising annealing, cold rolling and hot rolling, as will be described. So formed, the shank satisfies all the foregoing objects. The stiffness is extremely high because of the use of beryllium in the advantageous thin-walled tube geometry. The mass of the shank is extremely low because of an average wall thickness of 0.000633". Thus, the shank and its method of formation are believed to represent a significant advance toward perfection in the art of phonograph stylus shanks and their formation.

BRIEF DESCRIPTION OF THE DRAWING

The preferred embodiment of the invention is described below, in relation to the accompanying drawing. The drawing includes twelve figures, briefly described as follows:

FIG. 1 is an elevation view of a representative stylus assembly, into which the shank of this invention may be incorporated;

FIG. 2 is a perspective view of a phonograph stylus shank formed in accordance with the preferred embodiment of the invention;

FIG. 3 is an end view of the shank of FIG. 1;

FIG. 4 is a cross-section view taken along line 4—4 of FIG. 2;

FIG. 5 is a cross-section view similar to FIG. 4 of a phonograph stylus shank formed in accordance with an alternative embodiment of the invention;

DETAILED DESCRIPTION OF THE PREFERRED EMBODIMENT

Figure 6:
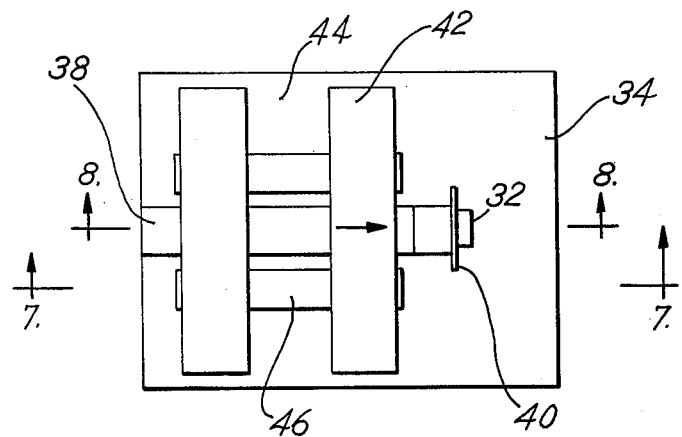
FIG. 6 is a plan view of apparatus for forming the shanks of FIGS. 2-5.

Referring to FIG. 2 of the accompanying drawing, the preferred embodiment of this invention is a phonograph needle or stylus shank generally designated 10. The shank 10 comprises a shaft portion 12 and a paddle portion 14. The shank 10 is intended for a stylus assembly 16 with a stylus tip 18 and transducer 20, as shown by example in FIG. 1.

Referring to FIG. 4, the shaft portion of the preferred shank 10 is tubular, defining a hollow interior 22 within a shank wall 24. The shank 10 has a longitudinal, overlapping seam 26, and the wall 24 has a first end portion 28 and a second end portion 28. The end portion 28 overlaps the second end portion 30. The seam 26 defines the end of the first end portion 28, and the beginning of the second end portion 30. As the stylus shank 10 is most preferred, the arcuate angle through which the portions 28, 30 overlap and underlap each other is approximately 120 degrees. Other greater or lesser overlaps may be suitable.

Figure 10:
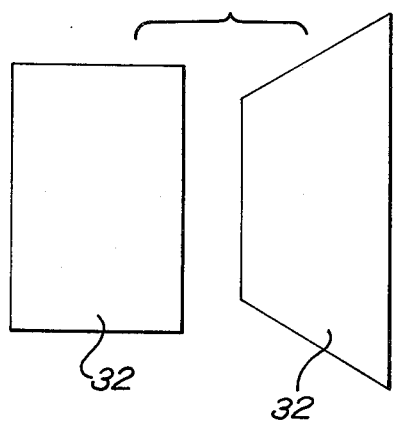
FIG. 10 is a view of the preferred and an alternative blank for the shanks of FIGS. 2-5.

The stylus shank 10 comprises a rolled sheet of pure beryllium. Referring to FIG. 10, the initial, flat sheet or blank 32 from which the shank 10 is formed may be rectangular, trapezoidal, or otherwise. As most preferred, the sheet 32 is rectangular. Also as most preferred, the sheet 32 has a thickness of approximately 0.0005". With a 120 degree overlap, the average wall thickness of the stylus shank 10 is then 0.000633".

The stylus shank 10 is formed from the sheet 32 through a process of annealing and rolling the sheet 32. As preferred, the process of formation includes a single step of annealing, followed by two steps of rolling. The rolling steps are first, a cold rolling step, and second, a hot rolling step.

The annealing step comprises a vacuum annealing, at approximately 1500° F. Vacuum annealing is used, to inhibit beryllium oxide formation.

The sheets 32 are annealed between ceramic plates.

Figure 7:
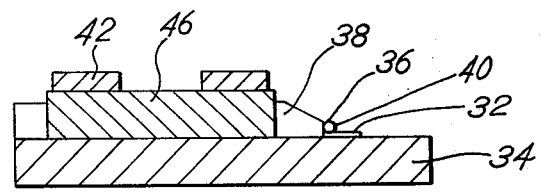
FIG. 7 is a cross-section view of the apparatus of FIG. 6, taken along line 7—7 of FIG. 6.

The cold rolling step includes rolling about a mandrel or pin. As shown in FIGS. 6 and 7, an annealed sheet 32 is placed on a pad 34, abutting the end face 36 of a central guide 38. A mandrel, or rolling pin 40, is laid atop the sheet 32. The pin 40 abuts the end face 36. A pressure applicator or sled 42 with two slides 44, 46 is laid atop the pin 40, with the slides adjacent the central guide 38, above the pad 34. The pad 34 is an elastomeric material such as silicone rubber, the pin 40 is tungsten carbide, and the applicator 42 is any suitable hard material.

Figure 8:
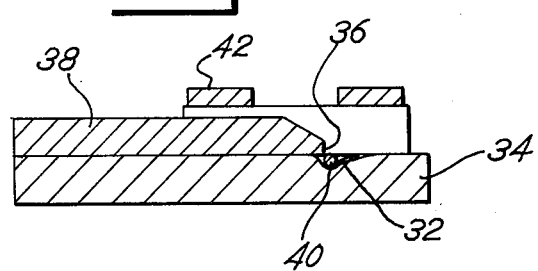
FIG. 8 is a cross-section view of the apparatus of FIG. 6, taken along line 8—8 of FIG. 6, during a first rolling step of the formation of the shanks of FIGS. 2-5.

The cold rolling step proceeds with the application or pressure through the applicator 42, to the pin 40, sheet 32 and pad 34, as in FIG. 8. The pressure presses the pin 40 into the sheets 32 and into the pad 34, distorting the surfaces of the sheet 32 and pad 34. The applicator 42 and pin 40 are then moved across the pad 34, from the end face 36. With this motion, the sheet 32 curls or winds tightly about the pin 40.

The pressure is then released. The cold rolling step is completed. Because of its resilience, the wound sheet 32 may partially unwind.

Figure 9:
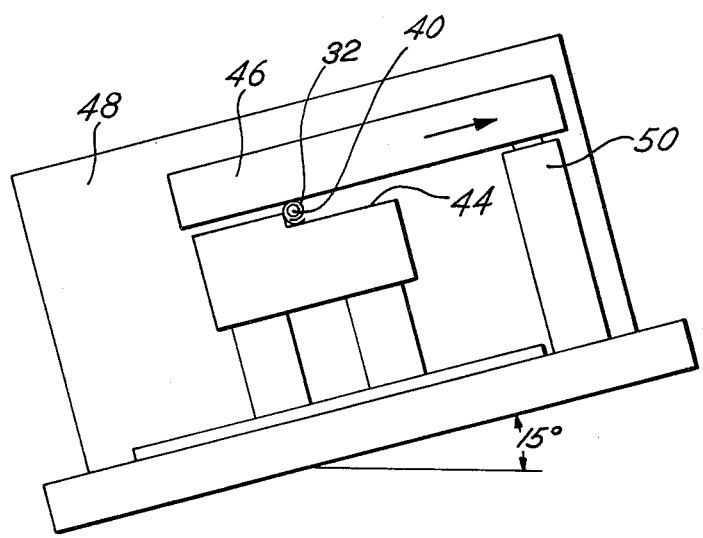
FIG. 9 is a side elevation view of further apparatus for forming the shanks of FIGS. 2-5, during a second rolling step of the formation.

The hot rolling step is then begun. Keeping the partially wound sheet 32 on the pin 40, the pin 40 is placed on a surface 44 as in FIG. 9, heated to about 850° F. or more. A plate of glass 46 or equivalently low heat conductive material, is roughened as by sandblasting, is placed atop the pin 40 and sheet 32.

The pin 40 is then rolled across the surface 44. Slow rolling, i.e., rolling at about three revolutions per ten seconds, is most preferred. A maximum rolling of three revolutions is also preferred. Suitable guides 48, 50 are provided for the plate 46.

The pin 40 is then removed from the surface 44 and allowed to cool. The sheet 32 will remain tightly wound about the pin 40.

The pin 40 is then removed, and the stylus shank 10 remains. The paddle 14 may be formed as preferred, by known methods. Caution should be exercised to avoid cracking of the shank 10. As most preferrred, the paddle 14 is formed under heat, without extremely sharp bends and with the seam 26 in the location shown in FIG. 2.

As apparent, the shape and diameter of the pin 40 determine the shape and inner diameter of the shank 10. As also apparent, the orientation of the pin 40 relative to the sheet 32 during rolling determines the orientation of the seam 26. As most preferred, the pin 40 is non-tapered, or cylindrical, and as shown, the pin 40 is oriented parallel to an edge of the preferred rectangular sheet 32 during rolling. The resulting shank 10 is a substantially cylindrical spirally wound tube, with the seam 26 parallel to the longitudinal axis of the shank 10.

The preferred shank 10 and its method of formation are now described. Various modifications can be made to the shank 10, as in FIG. 5. The shank 10 may be formed of a sheet 32 with a damping material 50, which may serve as a cement or lubricant, between the end portions of the wall 52, 54.

Modification as described and otherwise is not considered to depart from the invention. For example, the pin or mandrel may be tapered for use with the alternative blank of FIG. 10, to form a tapered shank. Therefore, to particularly point out and distinctly claim the subject matter regarded as invention, the following claims conclude this specification.

What is claimed:

1. A phonograph stylus comprising a tubular beryllium stylus shank having a longitudinal overlapping seam, the phonograph stylus shank being the product of a process of rolling a sheet of beryllium into a spirally wound tube, with the sheet having a thickness no greater than approximately 0.005 inches.

2. A phonograph stylus as in claim 1 in which the sheet has the thickness of approximately 0.0005 inches.

3. A phonograph stylus as in claim 1 in which the shank is substantially cylindrical and includes a shank wall with a first end portion and a second end portion, the first end portion being overlapped over the second end portion by approximately 120 degrees.

4. A phonograph stylus as in claim 1 in which the sheet is rectangular and the sheet is rolled on a cylindrical mandrel.

5. A phonograph stylus as in claim 1 in which the phongraph stylus shank is the product of a process of the following steps of:
    annealing the sheet;
    then cold rolling the sheet about a mandrel: and
    then hot rolling the sheet about the mandrel against a surface heated to approximately 850° F.

* * * * *